Nov. 29, 1938.     B. L. MATTHEWS     2,138,767
GAS COCK
Filed Sept. 30, 1936

INVENTOR
Birchard L. Matthews
BY
ATTORNEY

Patented Nov. 29, 1938

2,138,767

UNITED STATES PATENT OFFICE 2,138,767

GAS COCK

Birchard L. Matthews, Lakewood, Ohio, assignor to The Patrol Valve Company, Cleveland, Ohio, a corporation of Ohio Application September 30, 1936, Serial No. 103,374

1 Claim. (Cl. 251—91)

The present invention relating, as indicated, to gas cocks refers more particularly to a new and improved gas regulating valve of the rotatable plug type.

The object of the invention is to provide a gas cock which is simple in construction, efficient in operation, and requires the minimum number of parts. Heretofore, cocks of the instant type have comprised a valve body having a tapered valve seat therein extending entirely through the body to permit the attachment, upon the ends of the rotatable plug, of means for manual regulation and means for tensioning such plug in its seat. These several means have always been on the outside of the valve body.

My invention has for its object to so construct the valve body and the rotatable plug that only the regulating means is accessible exteriorally of the body and the plug retaining means is confined entirely within the said body.

In its simplest form the novel gas cock comprises only two structural elements which are formed to provide the valve body and the rotatable plug and have internally arranged cooperating means integral with said body and plug to prevent separation thereof.

Other forms coming within the scope of this invention include the same improved construction of the valve body and rotatable plug and internally arranged resilient means for exerting longitudinal pressure upon the plug.

Another important feature of the present invention resides in the ability to position the rotatable plug member of the novel valve longitudinally with respect to the outlet thereof, i. e., when the improved valve is constituted by inlet and outlet openings arranged at right angles to each other in the form of an elbow fitting, the manual adjustment element of the plug may be arranged to be accessible from the front of the device. In the use of pilot regulating valves on gas stoves having a manifold positioned at the front of the top burner compartment beneath a top flange of the stove, it has been found a very difficult problem to gain access to the ordinary manual adjustment means of the valve which by reason of necessity in construction is not accessible from the front of the stove. This difficulty has been entirely overcome by the present novel valve and the adjustment plug thereof may be readily engaged by any tool from the stove front.

To the accomplishments of the foregoing and related ends, said invention, then, consists of the means hereinafter fully described and particularly pointed out in the claim; the annexed drawing and the following description setting forth in detail certain mechanism embodying the invention, such disclosed means constituting, however, but one of the various mechanical forms in which the principle of the invention may be used.

In said annexed drawing.

The several forms of the invention to be particularly described in connection with said drawing concern what is best known in the art as a pilot regulating valve, although it will be obvious from the following description that the novel structural features of this valve may be incorporated in many other types of gas cocks.

Figure 1:
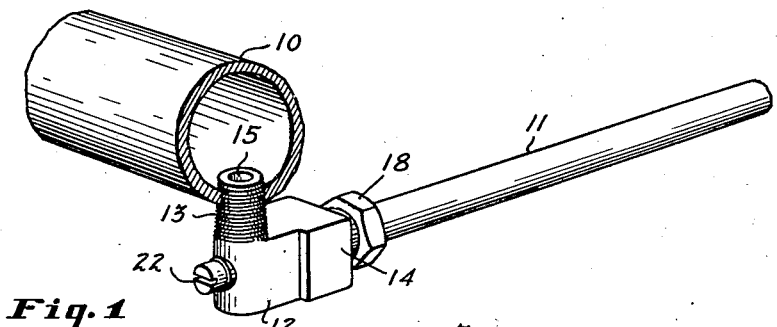
Fig. 1 is a perspective view illustrating a mode of utilizing the novel gas cock between a gas supply manifold and an appliance conduit.

Therefore, for illustrative purposes only, the new gas cock in Fig. 1 is shown having its threaded inlet extension 13 screwed into a suitable aperture in a gas supply manifold 10 and its outlet connection 14 connected to a tube or pipe 11. These several parts show the installation of the valve 12 connected, for example, between the manifold 10 and a constant pilot (not shown) of a gas range (also not shown).

Figure 2:
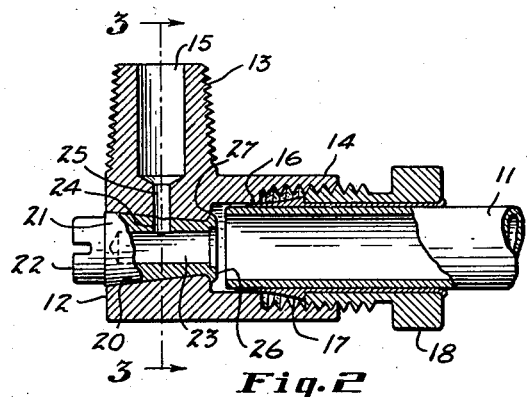
Fig. 2 is a vertical longitudinal cross-section, on an enlarged scale, of the gas cock of Fig. 1.
Figure 3:
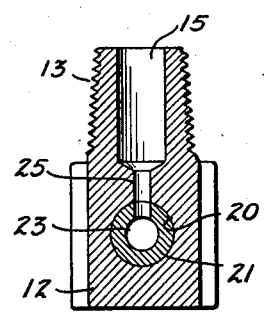
Fig. 3 is a cross-sectional view taken on line 3—3 of Fig. 2.

Figs. 2 and 3 are directed to the construction of the improved gas cock in its simplest form. In these illustrations the valve body 12 is formed with outwardly extending projections 13 and 14, respectively constituting the inlet and outlet sides of the valve. The inlet 13 is shown as being externally screw threaded for the facility of its attachment, as for example, to the manifold 10. The outlet 14 is internally screw threaded to receive therein one end of the tube 11 and an ordinary screw threaded tubing coupling 18. The inner end of tube 11 enters a recess portion 16 of the valve body in which position it is tightly compressed by means of the tapered portion 17 of the coupling connector 18. It is to be understood that the shapes of the inlet and outlet connections 13 and 14 are of no moment, and that they may assume any suitable form by which the novel valve may be connected in any flow line.

The valve body 12 has formed therein a tapered hole 20 which constitutes, as will appear, the seat for the rotatable plug member 21. The hole 20 preferably extends from one outside surface of the valve body entirely therethrough and communicates with the outlet opening within the portion 14. As will be seen from Fig. 2, the tapered plug 21 is internally longitudinally recessed as at 23 and also has a lateral communicating port 24 which is adapted to align with an internal inlet port 25 formed at the inner end of the passage 15 through the inlet portion of the valve.

As is customary in the function of devices of the present character, the plug 21 may be rotated by means extending exteriorally of the valve body to regulate the registration of ports 24 and 25, which of course may establish the full open position between the inlet and outlet of the valve or the closing off thereof. In the drawing, I have shown the rotatable plug with an integral extension 22 on its outer end which may serve as a carrier for the valve regulating handle shown in dotted lines at 58 in Fig. 5, or in which may be formed a slot to receive a screw driver for adjusting the valve. Obviously this projection 22 may be constructed in many forms, it being only necessary to provide some means by which the plug 21 may be rotated in its seat.

It has been stated that this invention contemplates a novel construction of the valve body and rotatable plug with integrally formed means serving to secure the rotatable plug in place. As has been described above, the inner end of the plug 21 projects into the internal recess 16 at the outlet side of the valve. This recess portion 16 which is larger than the bore of valve seat 20 is connected thereto by means of a shoulder 27. In actual construction the inner end of plug 26 is projected a slight distance into the outlet recess 16 beyond the shoulder 27 and this projecting end is spun over as at 26 to overlie the juncture of shoulder 27 with seat 20. In this manner a very effective means is provided to both prevent the separation of plug 21 from the valve body and to firmly engage such plug in its seat depending upon the force used in spinning over the portion 26. It is desirable to have the rotatable plug fit snugly within the valve stem 20 in order that the same may not be jarred out of adjusted position, and I have found that the above described interlocking engagement between the portions 26 and 27, of the plug and body respectively, serves very effectively to accomplish this desired result.

Figure 4:
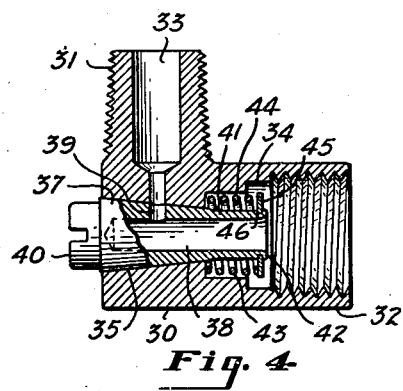
Fig. 4 is a view similar to Fig. 2 showing a modification of the invention.

In Fig. 4 the valve body 30 is shown provided with an inlet portion 31, an outlet portion 32, a passageway 33 to the inlet and a passageway 34 to the outlet. A tapered hole 35 through the valve body constitutes the seat for the rotatable plug 37 mounted therein. The plug 37 is provided with an internal longitudinal bore 38 and a lateral bore 39, adapted to communicate with the port provided at the inner end of inlet 33. Means for rotating the plug are seen at 40.

This embodiment differs from the one described hereinbefore in that the inner end 41 of plug 37 is projected a sufficient distance into the recessed portion 44 of the outlet so as to accommodate therein a coiled spring 43. This spring engages between the shoulder connecting the recess 44 with the valve seat bore 35 and a washer or other annular member 45 secured to the extreme inner end of rotatable plug 37. An effective method of attaching the washer 45 to the valve plug is shown in Fig. 4 as by providing a reduced annular shoulder 46 on the outside of extension 41 adjacent its inner end and then spinning over the plug terminal portion 42 to fixedly engage such washer in the recess 46.

The form of the invention shown and described in connection with Fig. 4 is believed to be of immense advantage over all known prior construction wherein a tapered valve plug is spring pressed in its seat. In no device before the present invention has the spring means been located entirely within the valve body. It will be seen that this novel embodiment of the present invention does successfully provide the internal spring attachment of the valve plug within the body and in no way impedes the flow of gas or other media through the opening 38 in such plug.

Figure 6:
Fig. 6 is a detailed view of the plug spring means illustrated in Fig. 5.
Figure 5:
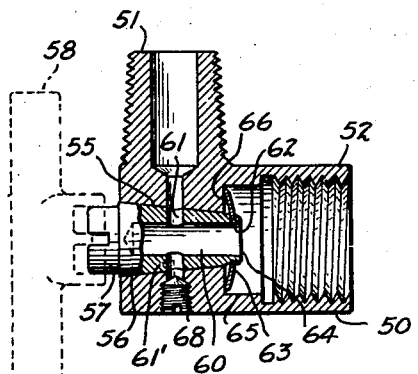
Fig. 5 is also like Fig. 2 and shows a still further modification of the invention.

Fig. 5 concerns a slight modification, or rather a combination of the structural features of the two embodiments described above. In this latter form the valve body 50 comprises an inlet 51, an outlet 52 and a tapered valve seat 55. The valve or rotatable plug 56, having a longitudinal port 60 and lateral port 61, is mounted in the seat in the same manner as described in connection with said previous modifications. A projection 57 permits the manual adjustment of the rotatable plug either by a handle 58 or any other suitable means. The valve body at this outlet portion is provided with an internal recess 65 and an annular shoulder portion 66 connecting the recess with the inner end of valve seat 55. The inner end of rotatable plug 56 projects within the recess 65 and has formed thereon an annular reduced portion 62. Mounted upon this reduced portion 62 is a spring washer 63 and this washer is fixedly secured in place by spinning over the inner terminal portion of the rotatable plug as at 64. The form of the spring washer 63 is best seen in Fig. 6.

It may be required in valves of the present character that the ports through the valve body and rotatable plug be periodically cleaned out and, inasmuch as the rotatable plug of the improved valve is substantially permanently anchored in the valve body, it may be found expedient to provide a removable clean out plug 68. As seen in Fig. 5, plug 68 is threaded into an opening in the valve body in alignment with the inlet opening and communicating port, and the plug 56 is supplied with an additional port 61' so that when the plug 68 is removed a cleaning tool may be inserted through the opening in the valve body to enter the several ports in the rotatable plug 56 and the inlet opening in the valve body 50.

It will be manifest from the foregoing description that I have accomplished the objects primarily stated and that by such disclosed mechanisms I have provided a simple efficient improved gas cock. Furthermore, it will be understood that such specific described embodiments are illustrative only of operating forms of the invention and not limitative. The invention is capable of considerable modification and is limited solely by the annexed claim.

I claim:

In combination, a one piece valve body having a tapered valve seat therein and a plurality of passages in communication with said seat, one of said passages constituting an enlarged recess of greater diameter than said tapered seat, a rotatable tapered valve plug in said seat and having a port therein to register with said passages to open or close the valve upon rotation of the plug, the inner end of said plug terminating interiorly of said valve body, and spring means located wholly within the valve body and within said recess, said means engaging the plug inner end and engaged with the valve body interior to firmly hold said plug in its seat.

BIRCHARD L. MATTHEWS.